United States Patent [19]

Gregor

[11] 4,000,868
[45] Jan. 4, 1977

[54] DEFLECTOR BLADE OF VARIABLE CAMBER
[75] Inventor: Peter Gregor, Immenstaad, Germany
[73] Assignee: Dornier GmbH, Friedrichshafen, Germany
[22] Filed: Nov. 10, 1975
[21] Appl. No.: 630,184
[30] Foreign Application Priority Data
Nov. 12, 1974 Germany .......................... 2453558
[52] U.S. Cl. .............................. 244/12.5; 244/44; 416/23; 416/240
[51] Int. Cl.² ........................................ B64C 15/06
[58] Field of Search ............... 244/12 D, 23 D, 44; 416/23, 240

[56] References Cited
UNITED STATES PATENTS

| 2,740,597 | 4/1956 | Wittman | 244/44 |
|---|---|---|---|
| 2,929,580 | 3/1960 | Ciolkosz | 244/12 D |
| 3,109,613 | 11/1963 | Bryant et al. | 244/44 |
| 3,212,731 | 10/1965 | Kappus | 244/12 D |
| 3,698,668 | 10/1972 | Cole | 244/44 |

Primary Examiner—Trygve M. Blix
Assistant Examiner—Barry L. Kelmachter
Attorney, Agent, or Firm—Hans Berman

[57] ABSTRACT

A deflector blade suitable for directing jet exhaust of an aircraft rearward or downward has leading and trailing edge portions and an intermediate portion interposed between the edge portions. The three portions and a crank constitute a four-bar linkage connected by four pivots having parallel axes of which a first connects the leading edge portion and intermediate portion, the second connects the crank and the leading edge portion, the third connects the intermediate and trailing edge portions, and the fourth connects the trailing edge portion and the crank. The line connecting the axes of the first and third pivots intersects the connecting line defined by the axes of the second and fourth pivots. When the crank is moved about the axis of the second pivot, the blade is moved between a neutral position for rearward jet exhaust and one of positive angle of deflection in which the jet exhaust is directed downward for providing lift to the aircraft.

9 Claims, 8 Drawing Figures

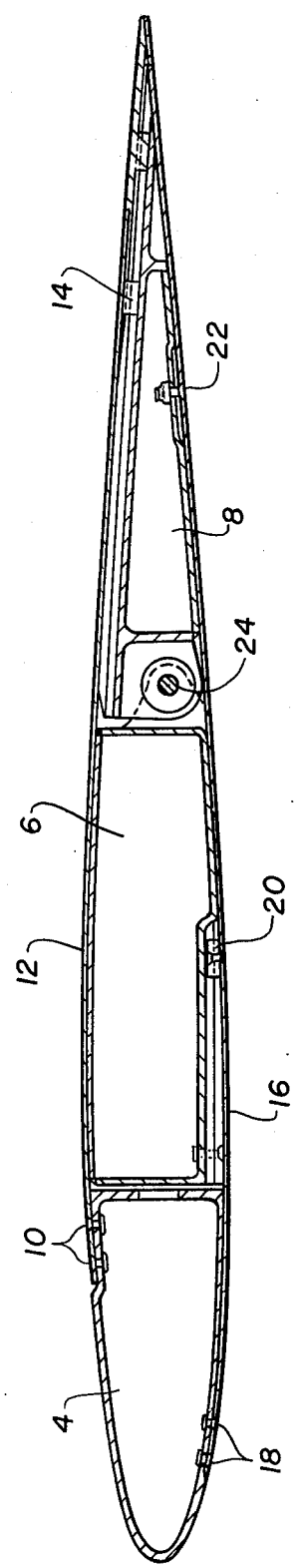
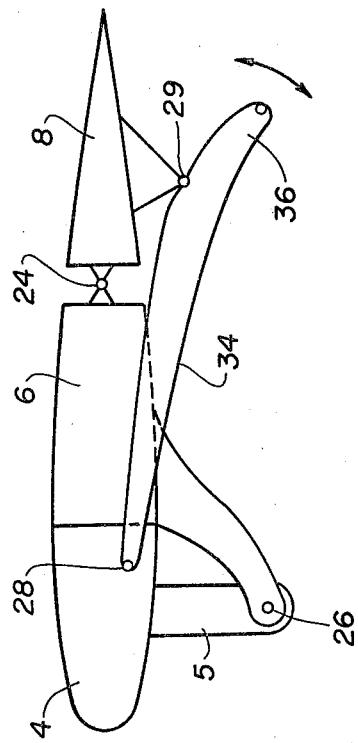
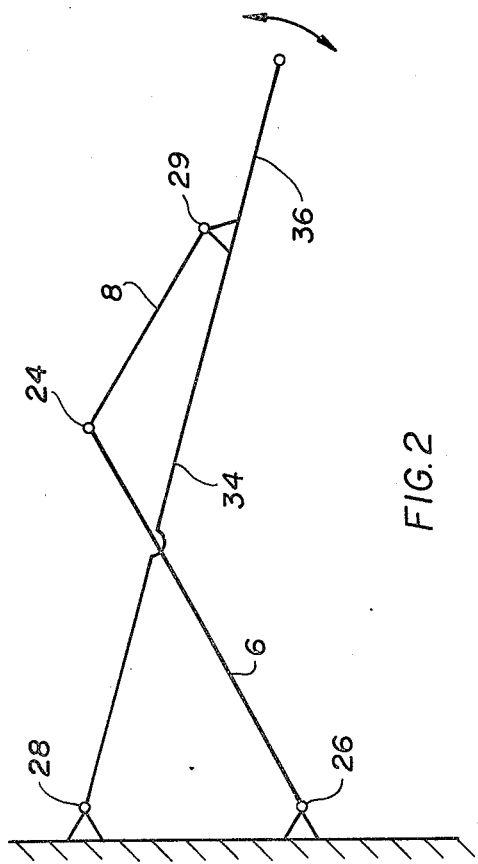
FIG.1
FIG.3
FIG.2

DEFLECTOR BLADE OF VARIABLE CAMBER

This invention relates to aircraft, and particularly to a blade of variable camber having a leading edge portion and a trailing edge portion hingedly connected by an intermediate edge portion, and to aircraft equipped with such deflector blades in its exhaust conduit.

The invention will be described hereinbelow with specific reference to a blade which may assume the shape of an airfoil. Airfoils of variable camber were proposed heretofore, but the actuating mechanisms of the known devices are complex and correspondingly costly and subject to failure so that they did not find practical acceptance. It is a primary object of this invention to provide an airfoil-shaped deflector blade of variable camber suitable for varying the direction of a stream of gas ejected by an aircraft which blade is of simple structure and reliable in its operation.

The invention, in one of its aspects, provides a deflector blade having leading and trailing edge portions and an intermediate portion interposed between the edge portions. Four pivots having spaced, parallel axes, the afore-mentioned portions, and a crank constitute a four-bar linkage. A first pivot connects the intermediate and leading edge portions, the second pivot connects the crank and the leading edge portion, the third pivot the intermediate and trailing edge portions, and the fourth pivot the trailing edge portion and the crank. When the crank is moved about the axis of the second pivot, the camber of the blade is changed. The axes of the first and third pivots define a connecting line which intersects the connecting line defined by the axes of the second and fourth pivots in a plane perpendicular to the axes. When the crank member is moved angularly about the axis of the second pivot, the two edge portions move angularly relative to each other in a particularly advantageous manner.

In another aspect, the invention resides in an aircraft including a source of a stream of gas mounted on the airframe, and at least one blade of the invention mounted on the airframe and arranged in the gas stream for deflecting the stream between two angularly offset paths.

Other features, additional objects, and many of the attendant advantages of this invention will readily be appreciated as the same becomes better understood by reference to the following detailed description of a preferred embodiment when considered in connection with the appended drawing in which:

FIG. 1 shows a blade according to the invention in side-elevational section in its neutral position;

FIG. 2 diagrammatically illustrates the four-bar linkage constituted by elements of the blade shown in FIG. 1;

FIG. 3 is a simplified side-elevational view of the elements which constitute the linkage of FIG. 2;

Figure 4:
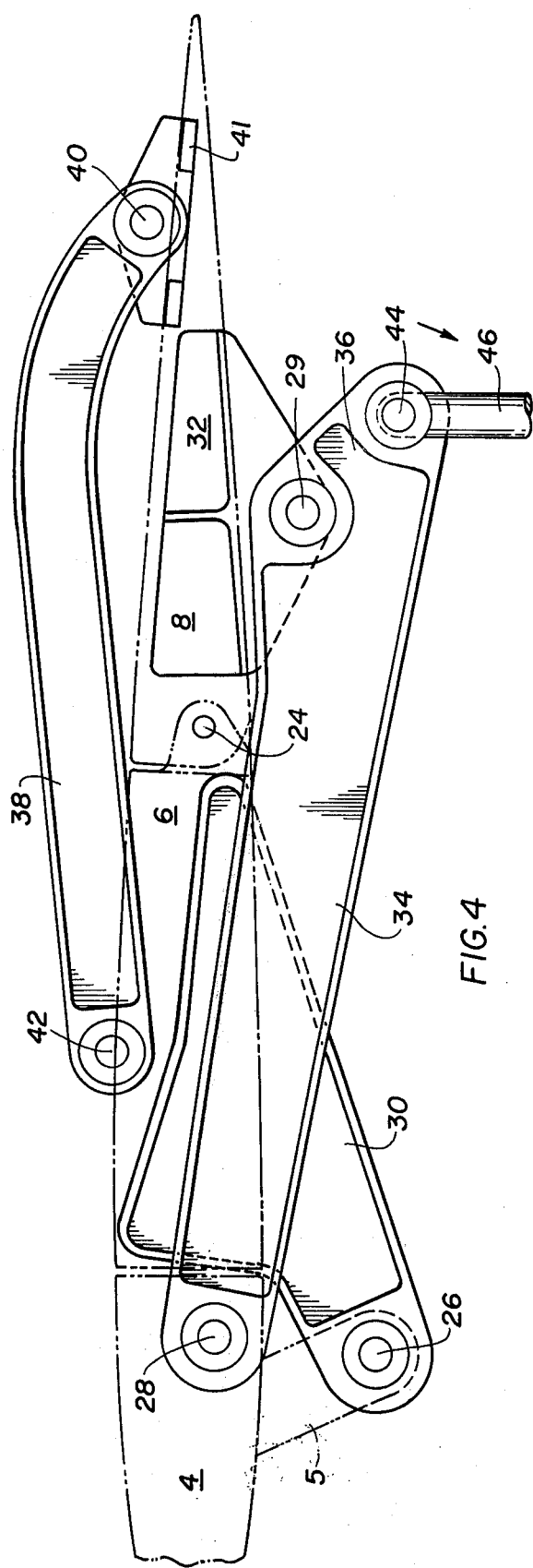
FIG. 4 shows operating mechanism for the blade in the neutral position.

Referring initially to FIG. 1, there is seen an exhaust deflecting blade of the invention in its neutral or propulsion position. The blade has a box-like leading edge portion 4, an intermediate box-like portion 6, and a trailing edge portion 8 or box-like structure connected to the intermediate portion by a pivot 24. The joints or gaps between the three portions of the blade are closed by a flexible sheet-metal cover 12 on the top of the blade and by a similar cover 16 at the bottom so as to give the blade the contour of an airfoil. Two rows of rivets 10 fasten the front edge of the cover 12 to the leading edge portion 4 closely adjacent the intermediate portion, and slides 14 fastened to the terminal rear part of the cover 12 are guided in dovetail grooves on the trailing edge portion 8. The cover 12 is movable backed by the intermediate portion 6. The bottom cover 16 is attached to the leading edge portion 4 by rivets 18 and to the trailing edge portion 8 by rivets 22, while slides 20, fixedly fastened to the cover 16, are guided and retained in conforming dovetail grooves of the intermediate blade portion 6.

It will be understood that the blade is elongated at right angles to the plane of FIG. 1 and of uniform cross section over its length. The elements which connect the three principal portions of the blade in a four-bar linkage have been largely omitted from the showing of FIG. 1.

The linkage is diagrammatically illustrated in FIG. 2 which shows the three blade portions 4, 6, 8 and the pivot 24 also seen in FIG. 1 together with a crank 34 and additional pivots 26, 28, 29. A first pivot 26, not seen in FIG. 1, connects the intermediate portion 6 to the leading edge portion 4, normally fixed to a supporting portion of an aircraft, not shown in FIG. 2. A second pivot 28 on the leading edge portion 4 hingedly fastens one end of the crank 34. The fourth pivot 29 connects the trailing edge portion 8 to the crank 34. The crank 34 has an end portion 36 remote from the pivot 28 and projecting beyond the pivot 29 which may be swung about the axis of the pivot 28 as indicated by a double arrow.

The axes of the several pivots 24, 26, 28, 29 are parallel and transversely spaced from each other. The line representing the intermediate portion 6 in FIG. 2 and connecting the axes of the pivots 24, 26 intersects the line representing the crank 34 and connecting the pivots 28, 29.

As is better seen in side-elevation in FIG. 3, the pivot 24 is confined within the contour of the blade and may thus extend over the full length of the same. The pivot 26 is mounted on a bracket 5 which projects downward from the main structure of the leading edge portion 4. The bracket 5, crank 34, and pivots 26, 28, 29 are duplicated on the other side of the illustrated blade and obscured in FIG. 3.

FIG. 4 shows one of the two sets of the load-bearing elements which connect the several pivots 24, 26, 28, 29. A rigid lever 30, which is a fixed element of the intermediate blade portion 6, connects the pivots 24, 26. A bracket 32 constitutes the coupler between the pivots 24, 29 on the trailing edge portion 8. Each of two guide arms 38 which depress the top skin 12 is hinged to the afore-mentioned supporting aircraft, not seen in FIG. 4, by a pivot 42, and a pivot 40 on the other end of the arm 38 carries a slide 41 fastened to the skin 12. A pivot 44 on the free end portion 36 of the crank 34 fastens an actuating rod 46 to the crank, the rod being under the pilot's control or remotely controlled, as is conventional in itself. The rod permits the crank 34 to be swung on the fixed pivot 28, whereby the elements shown in FIG. 4 may be shifted to the respective positions seen in FIG. 5.

Figures 5, 8:
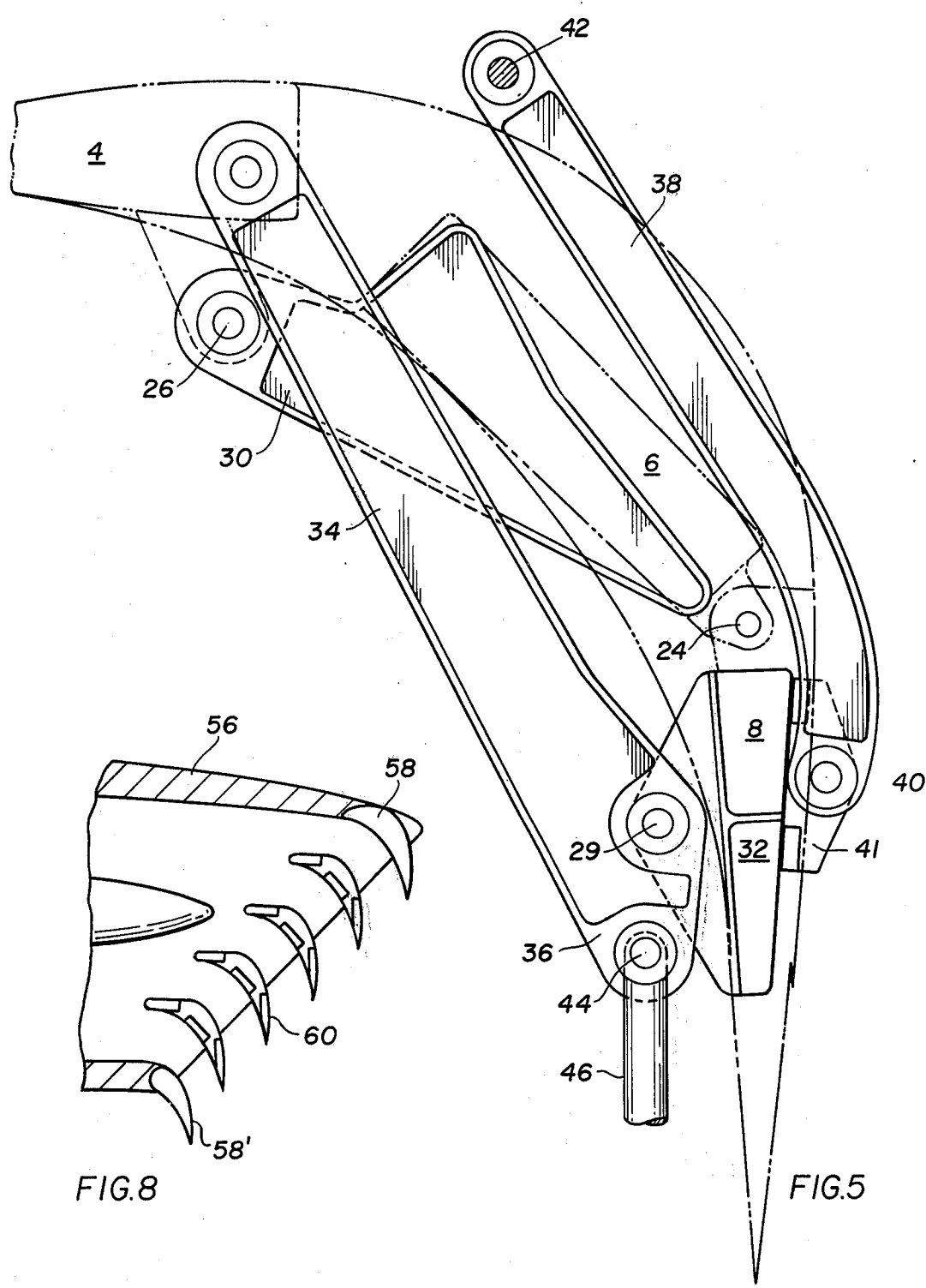
FIG. 5 illustrates the mechanism of FIG. 4 in a different position.
FIG. 8 shows a portion of the aircraft of FIG. 7 in fragmentary enlarged view in a different operating condition.

The three principal blade portions 4, 6, 8 are indicated in FIGS. 4 and 5 in phantom lines only to illustrate the overall shape of the blade. Because the distance between the pivots 28, 29 is necessarily constant, the bottom skin 16 may be fixedly fastened to the leading and trailing edge portions 4, 8 and maintain a desirable contour during movement between the positions of FIGS. 4 and 5. The angular relationship of the trailing edge portion 8 to the leading edge portion 4 may be changed by about 90°, as is shown in FIGS. 4 and 5, during such movement, but a range of movement between 60° and about 105° may be chosen to suit specific requirements.

Figure 7:
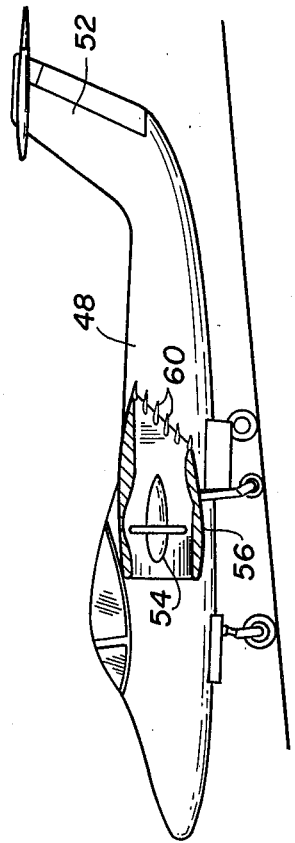
FIG. 7 illustrates the aircraft of FIG. 6 in side-elevational section on the line VII — VII.
Figure 6:
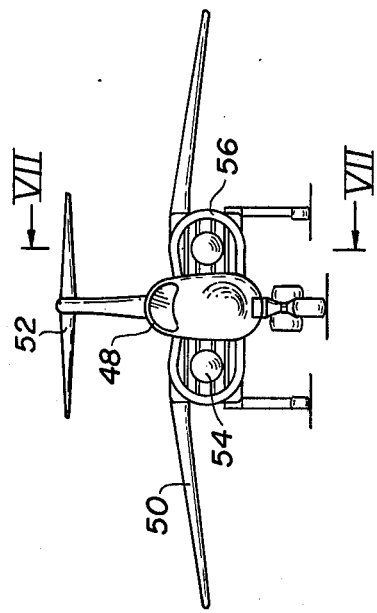
FIG. 6 is a front elevation of a twin-jet aircraft equipped with two sets of blades of the type shown in FIGS. 1 to 5.

FIGS. 6, 7, and 8 illustrate a twin-jet aircraft of the STOL or VTOL type whose propeller version has been known for a long time (see U.S. Pat. Nos. 2,918,230 and 2,929,580). The airframe of the illustrated craft includes a fuselage 48, wing 50, and a tail assembly 52. Two jet engines 54 are mounted on either side of the fuselage 48 in pods 56 under the wing 50.

Each pod 56 houses one of the engines 54 and bounds a conduit whose cross section is circular at the leading end and approximately square at the trailing end of the pod, the latter end being cut off at an angle of about 45° to the normal direction of horizontal flight, as is best seen in FIG. 8. Air enters the leading orifice of the conduit, and the combustion gases generated by the engine 54 are ejected from the trailing orifice in a conventional manner.

Six deflector blades are mounted in the approximately square trailing orifice of the conduit. They are uniformly spaced in a vertical direction, approximately uniformly offset from each other in the normally horizontal direction of flight, and are thus spacedly aligned along the oblique rear edges of the pod 56. The uppermost and lowermost blades 58, 58' have two sections analogous to the intermediate portion 6 and the trailing edge portion 8 and pivotally fastened to the pod 56 in the manner described above with reference to the connection between the sections 6, 8 and the section 4. The four intermediate blades 60 are each of the type described with reference to FIGS. 1 to 5, their leading edge portions being fixedly fastened between the side walls of the pod 56 and connected with the intermediate and trailing edge portions by two sets of lateral levers, cranks, and pivots in a manner obvious from FIGS. 1 to 5, two guide arms 38 being mounted on the inner pod walls by means of respective pivots 42.

When the blades are in the position shown in FIG. 7, the stream of combustion gases generated by the engine 54 is ejected horizontally for propelling the aircraft. When the camber of the blades 58, 58', 60 is increased to the position shown in FIG. 8, the downwardly directed combustion gases provide lift for the aircraft and may permit it to hover. Because of their configuration, the deflector blades of the invention cause minimal turbulence in the downwardly ejected stream of gases.

The several blades 58, 58', 60 may be controlled in unison to provide forward or upward thrust or any combination of the two, and the aircraft may be banked by varying the camber of the two seats of blades respectively associated with the two engines 54 in a different manner. The necessary linkages between the several actuating rods 46 and the pilot's control panel are too well known to require description.

While the drawing illustrated a manned airplane, the invention is applicable in an obvious manner to an unmanned drone and to any other type of aircraft equipped with a source of a stream of gas and means for ejecting the stream. The propeller-equipped planes of the afore-mentioned patents thus are modified to advantage by incorporating therein the deflector blades of the invention, as are ramjet missiles and like devices.

It should be understood, therefore, that the foregoing disclosure relates only to a preferred embodiment of the invention, and that it is intended to cover all changes and modifications of the example of the invention herein chosen for the purpose of the disclosure which do not constitute departures from the scope and spirit of the invention set forth in the appended claims.

What is claimed is:
1. A deflector blade of variable camber comprising:
   a. a leading edge portion;
   b. a trailing edge portion;
   c. an intermediate portion interposed between said leading and trailing edge portions;
   d. a crank member;
   e. a first pivot hingedly connecting said leading edge portion to said intermediate portion;
   f. a second pivot hingedly connecting said crank member to said leading edge portion;
   g. a third pivot hingedly connecting said intermediate portion to said trailing edge portion,
   h. a fourth pivot hingedly connecting said trailing edge portion to said crank member,
      1. said first, second, third, fourth pivots having respective spaced, parallel axes,
      2. the axes of said first and third pivots defining a connecting line intersecting the connecting line defined by the axes of said second and fourth pivots in a plane perpendicular to said axes,
      3. a part of said crank member extending from said second pivot beyond said fourth pivot; and
   i. actuating means including an actuating member secured to said part of said crank member for angularly moving said crank member about the axis of said second pivot.
2. A blade as set forth in claim 1, wherein said portions jointly define a top face and a bottom face of said blade, said intermediate portion defining a gap with at least one of said edge portions, said gap extending between said faces, the blade further comprising a top cover and a bottom cover respectively superimposed on said faces and closing said gap.
3. A blade as set forth in claim 2, wherein said third pivot is confined in said gap.
4. A blade as set forth in claim 2, further comprising fastening means fixedly fastening respective parts of said bottom cover to said edge portions, said bottom cover movably covering the bottom face of said intermediate portion.
5. A blade as set forth in claim 2, further comprising fastening means fixedly fastening a portion of said top cover to said leading edge portion, and securing means securing another portion of said top cover to said trailing edge portion.
6. A blade as set forth in claim 1, wherein said actuating means include means for moving said trailing edge portion relative to said leading edge portion through an angle of at least 60°.

7. A blade as set forth in claim 6, wherein said angle is about 90°.

8. An aircraft comprising:
   a. an airframe;
   b. a source of a stream of gas on said airframe; and
   c. guide means for ejecting said stream from said source in a plurality of directions relative to said airframe, said guide means including at least one deflector blade having
      1. a leading edge portion fixedly mounted on said airframe in said stream of gas,
      2. a trailing edge portion;
      3. an intermediate portion interposed between said leading and trailing edge portions,
      4. a crank member,
      5. a first pivot hingedly connecting said leading edge portion to said intermediate portion,
      6. a second pivot hingedly connecting said crank member to said leading edge portion,
      7. a third pivot hingedly connecting said intermediate portion to said trailing edge portion,
      8. a fourth pivot hingedly connecting said trailing edge portion to said crank member,
         i. said first, second, third, and fourth pivots having respective spaced, parallel axes,
         ii. the axes of said first and third pivots defining a connecting line intersecting the connecting line defined by the axes of said second and fourth pivots in a plane perpendicular to said axes,
         iii. a part of said crank member extending from said second pivot beyond said fourth pivot, and
      9. actuating means including an actuating member secured to said part of said crank member for angularly moving said crank member about the axis of said second pivot.

9. An aircraft as set forth in claim 8, wherein said guide means include a plurality of said deflector blades, the leading edge portions of said blades being spaced in said stream of gas transverse to the direction of said stream.

* * * * *